W. PAINTER.
Methods of Forming Joints in Gas and Water Mains.

No. 198,146. Patented Dec. 11, 1877.

WITNESSES
D. H. Barclay
W. A. Bertram

INVENTOR
William Painter
R. D. Williams
Attorney

UNITED STATES PATENT OFFICE.

WILLIAM PAINTER, OF BALTIMORE, MARYLAND.

IMPROVEMENT IN METHODS OF FORMING JOINTS IN GAS AND WATER MAINS.

Specification forming part of Letters Patent No. 198,146, dated December 11, 1877; application filed October 5, 1877.

*To all whom it may concern:*

Be it known that I, WILLIAM PAINTER, of the city of Baltimore, State of Maryland, have invented certain new and useful Methods of Forming Joints in Gas and Water Mains; and I hereby declare the same to be fully, clearly, and exactly described as follows, reference being had to the accompanying drawings, in which—

Figure 1:
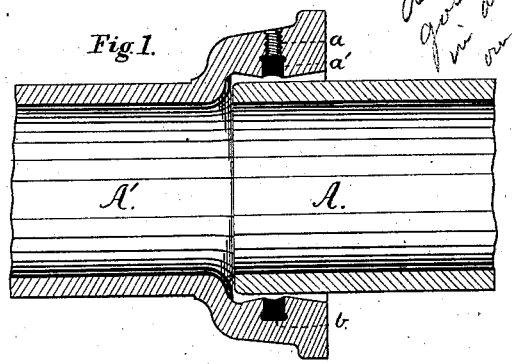
Figure 2:
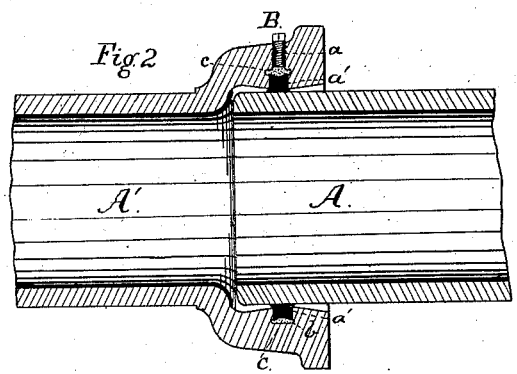
Figure 3:

Figure 1 represents a longitudinal sectional view of my improved pipe-joint; Fig. 2, a similar view, the lead gasket being forced to its seat; and Fig. 3, a cross-sectional view of the gasket.

This invention is designed to furnish a means of rapidly and economically forming a fluid-tight joint in pipes, and is especially adapted to gas and water mains.

Various devices for effecting this end are in use, consisting, essentially, of means for driving or calking a packing material or luting into the pipe-joint, or, conversely, for forcibly drawing the pipe-sections upon elastic or compressible gaskets or packings.

From its property of resisting the action of corroding agents lead is almost universally used as a packing, and is usually applied to the pipe-joint by casting in place and subsequent calking. The usual calked lead joint is, however, open to the objection that the slightest sagging of the pipes is liable to cause the joint to leak.

By my invention all the advantages of lead packing are secured, and at the same time all danger of leakage from sagging or other ordinary change of position in the mains is obviated. These desirable ends are attained by casting a lead gasket in a groove on the interior of the bell, and, after the sections are in place, forcing the gasket to its seat by means of fluid-pressure, as hereinafter described.

In the accompanying drawings, A A' represent, respectively, the male and female ends of a pipe-joint, differing from the ordinary construction in having upon the interior of the bell an annular channel, $b$, which communicates with the outside of the bell by means of the threaded opening $a$, in having the bore of the bell slightly enlarged at either side of the annular channel, to admit of deflection of the joint, and in the length of the bell itself, which is, say, from one-half to two-thirds of the ordinary length.

The annular channel $b$ is of the form shown in the drawings, and within it is cast the lead gasket $a'$.

The bell is enlarged at either side of the gasket, to admit of the joining of the pipes at a considerable angle without requiring the bell to be much larger than the male section. In case of deflection after laying the mains, the gasket becomes, as it were, a fulcrum, and the degree of change of form to which it is subjected is reduced to a minimum. This construction of the bell is not, however, essential.

In forming the joint I proceed as follows: The end of the male section being inserted within the bell, as in Fig. 1, a pipe is screwed into the opening $a$, and any suitable semi-fluid material, such as tar, (shown at $c$, Fig. 2,) is forced through between the lead gasket and the bottom of the groove by a pump or other convenient means, sufficient hydrostatic pressure being communicated to the gasket to force it into close contact with the pipe, and form a perfectly fluid-tight joint. Finally, the inlet-pipe is unscrewed, the opening $a$ is filled with moist clay, and a screw-plug, B, is inserted therein and screwed home, thus sealing the opening under pressure.

Any suitable semi-fluid substance may be used in forcing the lead gasket to its seat. Coal or wood tar is cheap material, and is found to answer good purpose, as, by reason of its viscid nature, it will not readily escape from any minute openings there may be between the lead gasket and the sides of the groove before the pressure is sufficient to start the gasket and cause its enlarged portion to crowd into the narrow part of the groove, effectually preventing the escape of the tar.

It is obvious that instead of using a lead ring applied to a groove or channel within the bell, and fluid-pressure to bring it into contact with the pipe, an annular tube of lead or other suitable material, wholly or partially collapsed, may be inserted as a packing, the same being expanded into close contact with the pipe by means of fluid (either liquid or gaseous) pressure applied through an opening communicating with the interior of the tubular gasket.

Other material, such as rubber, may be substituted for the lead shown. Such a mere modification I consider wholly within the scope of my invention, which consists, essentially, in forcing a gasket or packing into fluid-tight contact with a pipe-section by means of hydrostatic pressure.

Economically considered, some of the advantages of my invention may be briefly stated. It requires less than one-half the lead used in an ordinary pipe-joint, dispenses entirely with the usual supplemental packing of tow or hemp, may be applied in one-fourth the time required to fit an ordinary joint, and effects a saving of about one per cent. of pipe, the required length of bell being but about two-thirds that of the usual one. A further saving, in labor, results from the fact that no necessity exists for the enlargement of the trench required for calking in laying mains, as usually practiced.

My invention furnishes, under all the varying conditions to which gas and water mains are subjected, a perfectly fluid-tight joint, a most important object, especially in gas-mains, where the slightest leakage is attended with great loss and annoyance. Moreover, the joint will stand any required pressure when used in water-mains, without possibility of the gasket being forced from its seat, as frequently occurs with the ordinary joint, particularly in mains subjected to great and sudden pressure, as in the Holly system. This security is attained by the inclosure of the gasket within the groove in the bell, which construction also admits of the application of enormous and uniform pressure to the gasket by the method described, resulting in a more certain and perfect joint than has hitherto been produced.

By reason of the intimate and perfect contact of the gasket secured by this method, and its firm hold upon the rough surface of the iron, any ordinary longitudinal motion of the contact-surfaces by expansion and contraction of the mains, or by their deflection or sagging after laying, produces no leakage in the joint.

With the ordinary calked joint, the angle at which the sections can be joined is necessarily restricted on account of the narrowing of the calking-surface, while in my method the angle may be more than doubled, while still producing a perfect joint.

No small advantage attends the use of my invention when water is present in the trenches in which the mains are laid. Manifestly, under such conditions, with my method of forming the joint, no difficulty whatever is experienced.

The separation, when occasion requires, of the ordinary calked joint is rendered difficult, as well by the nature of the joint itself as by the presence of the bead on the end of the male section. Inasmuch as this feature is dispensed with in my joint, the separation of the parts, when desired, is readily effected, it being only necessary to withdraw the screw-plug and strike either section of pipe near the joint. The lead gasket is thereby enlarged, the tar escaping from the channel, and the sections may then be drawn apart. The joint so separated may obviously be renewed by applying hydrostatic pressure, as in the first instance.

My invention is also well adapted for laying mains under water or in difficultly-accessible places. In the former case it is usual to calk the lead into a ball-and-socket joint, and lay the line of mains from a scow. To make such a joint tight, it is usual to turn the convex end of the male section true and smooth, to allow of its movement against the lead packing. This is attended with considerable expense, and, moreover, to be perfectly tight, the joint must necessarily be quite rigid, whereas flexibility is desirable.

By the use of my invention it is unnecessary that the end of the male section be either smooth or true. The mains are simply joined and the gasket forced to its seat by moderate pressure, so as to hold the sections strongly together, and still allow of a free movement.

When the mains are in position in the bed of the stream, connection between the joint and pump being maintained, the ultimate pressure is brought upon the gasket, making the joint perfect. The opening in the bell is finally closed by means of a screw-plug, or in any other convenient manner.

As stated, any appropriate device, such as an ordinary force-pump, properly constructed, may be used to force the semi-fluid material into the groove. I have not considered it necessary to describe here, in detail, such a device, since appropriate means will necessarily suggest themselves to any one practicing the art.

Having thus described my invention, what I claim as new, and desire to secure by Letters Patent, is—

1. The method herein described of sealing the joints of gas and water mains, the same consisting in interposing a gasket between the pipe-sections, and forcibly seating the same by means of hydrostatic pressure external to or independent of that within the mains, substantially as described.

2. A pipe-joint having a gasket adapted to be seated by external hydrostatic pressure, substantially as described.

3. In a pipe-joint, a bell having an annular gasket, and an enlarged interior diameter on one or both sides of the gasket, to permit of deflection of the pipes, substantially as described.

4. A pipe-joint consisting of a male and a female section, having an interposed gasket seated by means of external fluid-pressure, substantially as described.

WILLIAM PAINTER.

Witnesses:
S. D. WILLIAMS,
C. E. SIMMONS.